US012709277B2

(12) United States Patent
Jaddu et al.

(10) Patent No.: US 12,709,277 B2
(45) Date of Patent: Aug. 18, 2026

(54) SYSTEMS AND METHODS FOR OPERATOR MONITORING AND FATIGUE DETECTION

(71) Applicant: NAQI LOGIX INC., Vancouver (CA)

(72) Inventors: Sai Hardhik Jaddu, Uppal (IN); Satyanarayana Jaddu, Uppal (IN)

(73) Assignee: NAQI LOGIX INC., Vancouver (CA)

( * ) Notice: Subject to any disclaimer, the term of this patent is extended or adjusted under 35 U.S.C. 154(b) by 0 days.

(21) Appl. No.: 18/273,995

(22) PCT Filed: Feb. 4, 2022

(86) PCT No.: PCT/IB2022/051000
§ 371 (c)(1),
(2) Date: Jul. 25, 2023

(87) PCT Pub. No.: WO2022/168000
PCT Pub. Date: Aug. 11, 2022

(65) Prior Publication Data

US 2024/0425058 A1 Dec. 26, 2024

Related U.S. Application Data

(60) Provisional application No. 63/145,759, filed on Feb. 4, 2021.

(51) Int. Cl.
*B60W 40/08* (2012.01)
*H04W 4/02* (2018.01)

(52) U.S. Cl.
CPC .............. *B60W 40/08* (2013.01); *H04W 4/02* (2013.01); *B60W 2040/0818* (2013.01);
(Continued)

(58) Field of Classification Search
CPC ........... B60W 40/08; B60W 2540/227; B60W 2756/10; B60W 2540/221; B60W 2040/0818; B60W 2040/0872; H04W 4/02
(Continued)

(56) References Cited

U.S. PATENT DOCUMENTS 9,579,060 B1 * 2/2017 Lisy ..................... A61B 5/6803
10,874,346 B1 12/2020 Lisy et al.
(Continued)

FOREIGN PATENT DOCUMENTS

CN 103948394 A 7/2014

OTHER PUBLICATIONS

J. Gwak et al., "Early Detection of Driver Drowsiness Utilizing Machine Learning based on Physiological Signals, Behavioral Measures, and Driving Performance," 21st International Conference on Intelligent Transportation Systems (ITSC), 2018, pp. 1794-1800 (Year: 2018).*

(Continued)

*Primary Examiner* — Naomi J Small
(74) *Attorney, Agent, or Firm* — DLA Piper LLP US

(57) ABSTRACT

Disclosed are systems and methods for operator monitoring and fatigue detection. Disclosed systems and methods may be used to monitor operators in real-time in order to identify and/or prevent any possible cause for a potential hazard by alerting the operator and/or taking preventive measures in the event of receiving a failed response from the operator. In some embodiments, operators may be monitored by a wearable device including a plurality of sensors. In some embodiments, a system for operator monitoring may include an operator monitoring device configured to determine operator positional data, a vehicle base station configured to determine vehicle positional data, apply a machine learning based
(Continued)

algorithm to determine if the operator is in a state of reduced alertness, and perform a corrective measure responsive to determining that the operator is in a state of reduced alertness, and a server system configured to train the machine learning based algorithm.

20 Claims, 6 Drawing Sheets

(52) U.S. Cl.
CPC ............... *B60W 2040/0872* (2013.01); *B60W 2540/221* (2020.02); *B60W 2540/227* (2020.02); *B60W 2756/10* (2020.02)

(58) Field of Classification Search
USPC ........................................................ 340/576
See application file for complete search history.

(56) References Cited

U.S. PATENT DOCUMENTS

| | | | | |
|---|---|---|---|---|
| 11,157,081 | B1 * | 10/2021 | Gu | A61B 5/7264 |
| 2004/0044293 | A1 | 3/2004 | Burton | |
| 2015/0092056 | A1 * | 4/2015 | Rau | G08B 21/06 348/148 |
| 2015/0265201 | A1 | 9/2015 | Arbas | |
| 2015/0314681 | A1 | 11/2015 | Riley, Sr. et al. | |
| 2017/0053513 | A1 | 2/2017 | Savolainen et al. | |
| 2017/0090475 | A1 | 3/2017 | Choi et al. | |
| 2019/0099118 | A1 * | 4/2019 | Patel | A61B 5/746 |
| 2020/0353933 | A1 | 11/2020 | Gilbert et al. | |

OTHER PUBLICATIONS

Sikander et al, "Driver Fatigue Detection Systems: A Review", IEEE Transactions on Intelligent Transportation Systems, vol. 20, No. 6, pp. 2339-2352, Jun. 2019.

Extended European Search Report issued in EP Application No. 22749341, 22 pages, dated Sep. 19, 2024.

Examination Report for Indian Patent Application No. 202317055447, dated Apr. 16, 2025, 6 pages.

Lourenco A., et al., "CardioWheel: ECG Biometrics on the Steering Wheel," Joint European conference on machine learning and knowledge discovery in databases. Cham: Springer International Publishing, 2015, vol. 9286, pp. 267-270, DOI: 10.1007/978-3-319-23461-8_27.

Communication Pursuant to Article 94(3) EPC for European Application No. 22749341.8, dated Aug. 4, 2025, 12 pages.

* cited by examiner

SYSTEMS AND METHODS FOR OPERATOR MONITORING AND FATIGUE DETECTION

CROSS REFERENCE TO RELATED APPLICATIONS

This application is a 371 of International Application No. PCT/IB2022/051000, filed Feb. 4, 2022, which claims priority to and the benefit of US Provisional Application No. 63/145,759 entitled "SYSTEMS AND METHODS FOR OPERATOR MONITORING AND FATIGUE DETECTION" which was filed on Feb. 4, 2021, the entireties of which are incorporated herein by reference.

TECHNICAL FIELD

The present disclosure is related to operation monitoring and fatigue detection systems.

BACKGROUND

Operator fatigue, distraction and/or negligence may contribute to accidents, incidents and hazards when operating vehicles and machines.

Conventional systems for detection of operator fatigue, distraction and/or negligence are unable overcome the challenges posed by the unpredictable nature of operator behavior, which makes it difficult to surveil personnel or equipment to identify and prevent incidents. Conventional systems for operator surveillance are often unable to operate in real time at the accuracy required for intervention. Further, conventional surveillance systems are limited by the amount of data required for analysis.

For example, solutions proposed by the U S Department of Transportation and Federal Railroad Administration, Office of Research, Development and Technology focus on motion sensing and image processing technology to predict operator fatigue and to generate alarms and precautionary actions. However, the solutions proposed by the US Department of Transportation and Federal Railroad Administration are limited by the huge size of data processing, and data transfer. Additionally, the systems proposed by the US Department of Transportation and Federal Railroad Administration require investments in expensive monitoring equipment.

Other countries have proposed monitoring systems for locomotive operators that are dependent on operator performance on driver desk controls in accordance with logic and time parameters. However, these monitoring systems are unable to detect operator fatigue.

Still further, other control systems such as the driver vigilance telemetric control system (DVTCS) investigates operator sensitivity to experimentally induced sleep loss and fatigue. However, the results from study are inconsistent and are unsuitable for developing operator fatigue interventions.

Some have proposed a design for an operator Fatigue Detection System for High-Speed Trains Based on Driver Vigilance Using a Wireless Wearable Electroencephalogrram (EEG). However, the proposed EEG solutions do not provide the required resolution and require the wearing of wet electrodes and dry electrodes that fit tightly on the skin, creating discomfort for operator. At the same time, there is no tracking of head position.

To that end, there remains a need for systems and methods that can detect and mitigate operator fatigue, distraction and/or operator negligence. Additionally, there remains a need for a low-cost solution that can be easily implemented within existing vehicles.

SUMMARY

Embodiments built in accordance with the present disclosure include systems and methods used for operator monitoring and fatigue detection. Operator monitoring may involve the continuous monitoring of the physical and mental condition of a person operating a designated equipment (e.g., machine) or vehicle (e.g., train, bus, car, boat). Operator fatigue detection may involve the early detection of decreased physical and mental activity on the part of an operator. This may be due in fact to a lack of operator concentration, attention, or other medical conditions. Operator fatigue is associated with accidents and presents hazards to the operator, others in the vicinity of the operator (i.e., passengers), and/or property.

Some embodiments built in accordance with the present disclosure may be used to monitor operators in real-time in order to identify as well as prevent any possible cause for a potential hazard by alerting the operator and/or taking preventive measures in the event of detecting operator fatigue or loss of concentration by way of receiving a failed response from the operator.

Common signs of operator fatigue include, but are not limited to, frequent yawning, difficulty in keeping eyes focused, constant head nodding, increased or decreased eye blinking, daydreaming/zoning out, and slower reaction time. Embodiments built in accordance with the present disclosure may use a combined device having an accelerometer, gyroscope, magnetometer, electroencephalography (EEG), electrocardiogramhy (ECG) and/or electromyography (EMG) and ear canal pressure sensor configured to provide early detection of common signs of operator fatigue. In some embodiments, a combined device may be formed in an ear bud and/or ear piece. Alternatively, a combined device may be configured to be placed within the ear canal, or placed behind an operator's ear.

In some embodiments, the combined device may be communicatively coupled to a secondary device. The secondary device may be stationary (i.e., car console, train console) or portable (i.e., tablet, mobile phone). The secondary device may be configured to determine the operator's posture and estimate deviations based on stated or predefined target function thereby assessing the focus and/or attentiveness of the operator.

Applications for the disclosed device include vehicles such as locomotives, commercial heavy-duty vehicles, automotive vehicles, air crafts, control panels, self-driven cars, and the like. Data from the disclosed systems may also be utilized in post-incident investigations and litigation.

Embodiments built in accordance with the present system and method allow for the real-time monitoring of operators of vehicles and machinery. The real-time monitoring of accurate parameters may enable the disclosed system to identify any potential hazards which may lead to an incident or accident. Alerts may be provided to the operator, supervisors, central monitoring systems and the like. Further, in some embodiments, the system and methods may be configured to take steps to mitigate a potential incident by performing pre-configured plans of action. Further, embodiments built in accordance with the system and methods described herein may decrease requirements for continuously engaged human personnel, result in decreased data transfer requirements, increase operator surveillance across vehicular systems thereby reducing operational costs and improving efficiency.

In some embodiments, a system for operator monitoring may include an operator monitoring device having operator positional information sensors and at least one biosensor, where the operator monitoring device records operator positional information and operator biosignals from an operator, and a vehicle base station communicatively coupled to the operator monitoring device, the vehicle base station having vehicle positional sensors and a user status artificial intelligence module configured to determine operator alertness status and initiate a corrective measure responsive to determining that the operator is in a state of reduced alertness. The biosensor may include an electroencephalogram (EEG) sensor, an electrocardiogram (ECG) sensor, or an electromyography sensor (EMG). Optionally, the user status artificial intelligence module may include a learning sub-module having normal and abnormal operator gesture patterns for training a random forest algorithm, and a prediction sub-module configured to apply the trained random forest algorithm to operator biosignals and operator positional information received from the operator monitoring device. Optionally, the vehicle positional sensors include an accelerometer, gyroscope, magnetometer, or global positioning system (GPS). Optionally, the operator positional sensors include an accelerometer, gyroscope or magnetometer. The operator monitoring device may include a pressure sensor. The operator monitoring device may be positioned within an ear canal of an operator. The operator monitoring device may be positioned adjacent to a back side of a concha. In some embodiments the system for operator monitoring may include a server communicatively coupled to the operator monitoring device or a vehicle base station, where the server comprises an asset tracking module configured to receive and display vehicle positional data from a plurality of vehicles. In some embodiments, corrective measure may include at least one of an audio alarm, visual alarm, and altered operation of a vehicle on which the vehicle base station is located.

In some embodiments, a method for operator monitoring may include recording operator positional information and operator biosignals from an operator, via an operator monitoring device, transmitting the operator positional information and operator biosignals to a vehicle base station communicatively coupled to the operator monitoring device, generating, at the vehicle base station, vehicle positional information, determining, at the vehicle base station, operator alertness status by applying a user status artificial intelligence module to the received operator positional information and vehicle positional information, and initiating, at the vehicle base station, a corrective measure responsive to determining that the operator is in a state of reduced alertness. Optionally, recording the operator biosignals may include recording at least one of electroencephalogram (EEG) signals, electrocardiogram (ECG) signals, and electromyography (EMG) signals, identifying a most relevant signal by applying a filter to the recorded signals, and applying feature extraction to the identified most relevant signal. Optionally, recording the operator positional information may include recording a signal obtained by at least one of an accelerometer, gyroscope, or magnetometer of the operator monitoring device. The method may also include the steps of training the user status artificial intelligence module by providing normal and abnormal operator gesture patterns to a random forest algorithm. In some embodiments, the user status artificial intelligence module includes a random forest algorithm. In some embodiments, the step of initiating the corrective measure includes providing one of an audio alarm or a visual alarm to the operator, receiving a responsive gesture from the operator, and altering operation of the vehicle or providing a second audio alarm or a second visual alarm to the operator responsive to receiving an inadequate response from the operator. In some embodiments the responsive gesture is one of a jaw clench, an eye blink, or an arm movement. The method may include the step of transmitting at least one of operator positional data and vehicle position data to a server system having an asset tracking module. The method may also include the step of positioning the operator monitoring device within an ear canal of an operator or adjacent to a back side of a concha. The method may also include the step of generating vehicle positional information comprises determining a vehicle position based on at least one of an accelerometer, gyroscope, magnetometer and global positioning device of the vehicle base station.

DETAILED DESCRIPTION

Disclosed herein are systems and methods for operator monitoring and fatigue detection. For example, the disclosed systems and methods may be configured to continuously monitor an operator's body language, behavior, emotional, physical, and mental state in order to identify signs of decreased focus, lack of attentiveness and/or fatigue.

Examples of signs of operator fatigue include, but are not limited to, frequent yawning, difficulty in keeping eyes focused, constant head nodding, shifting focus from attentive need, increased or decreased eye blinking, daydreaming, zoning out, and/or slower reaction time and the like.

Operator fatigue may be the result of physical or mental exertion by the operator. This may be due in part to a lack of adequate sleep, extended work hours, monotonous work, strenuous work or non-work activities, underlying medical conditions and the like.

In some embodiments, the disclosed systems may include an integrated operator monitoring device that includes one or more of an accelerometer, gyroscope, magnetometer, electroencephalography (EEG), electrocardiograms (ECG), and/or electromyography (EMG), bio-electrodes, pressure sensor and the like. The integrated operator monitoring device may detect head positioning and the like in order to determine whether the operator is in a state of decreased attentiveness and/or fatigued and the like.

In some embodiments, the integrated operator monitoring device may be coupled to a vehicle base station, which includes at least one on-board system that assists in continuously monitoring the status of the vehicle. If an operator is determined to be in a state of decreased attentiveness and/or fatigued state, the integrated operator monitoring device may be programed to alert the operator and/or control the operation of the vehicle in accordance with pre-configured settings. In some embodiments, the vehicle base station may also be configured to monitor the attentiveness of the operator based on vehicle speed and vehicle and/or operator response times, in order to provide flexibility to the operator at very low speeds.

Figure 1:
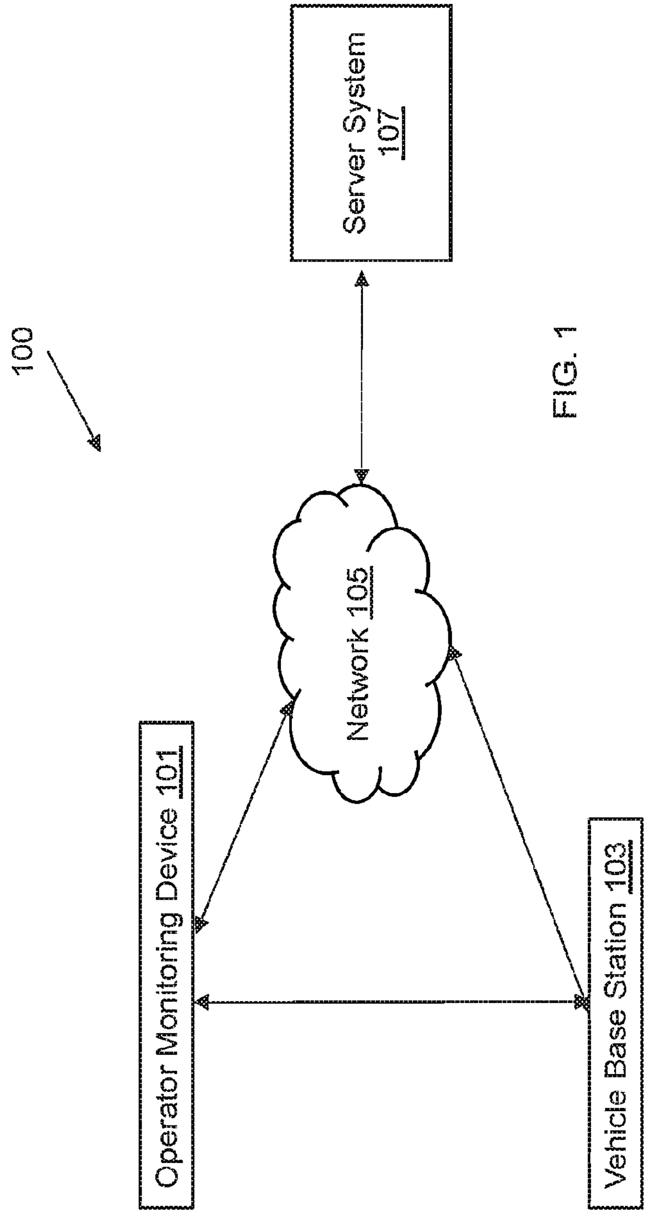
FIG. 1 provides a system and methods diagram of a system for operator monitoring and fatigue detection, built in accordance with aspects of the present disclosure.

FIG. 1 illustrates a system for operator monitoring and fatigue detection. The system 100 may include an operator monitoring device 101, a vehicle base station 103, a network 105, and a server system 107. In some embodiments, the operator monitoring device 101 may be communicatively coupled to the vehicle base station 103. Optionally, the vehicle base station 103 may be communicatively coupled to the server system 107 by way of network 105.

In some embodiments, the operator monitoring device 101 may include an accelerometer, gyroscope, magnetometer, electroencephalography (EEG), electrocardiogram (ECG) and/or electromyography (EMG), pressure sensor and the like. Examples of an operator monitoring device 101 is further illustrated in FIG. 2. The operator monitoring device 101 may be formed as an earbud, wearable device, or the like. In some embodiments, the operator monitoring device 101 may be configured to be placed within the car canal of an operator, or positioned behind the car of the operator, or the back side of the concha.

In some embodiments, the vehicle base station 103 may include a trained artificial intelligence module configured to receive operator status data from the operator monitoring device 101 and determine whether the operator is in a reduced state of alertness and the like. The vehicle base station 103 may also be configured to relay operator status data to the server system 107 and the like. The vehicle base station 103 may also be configured to determine and integrate vehicle status with operator status data. In some embodiments, the vehicle base station 103 may determine operator status based on one or more of the operator status data and the vehicle status data. The integrated vehicle status and operator status data may be transmitted to the server system 107. In some embodiments, the server system 107 may also determine operator status based on one or more of the operator status data and the vehicle status data. The vehicle base station 103 may also be configured to provide alerts to the operator responsive to a determination regarding the operator status and the like. The vehicle base station 103 is further illustrated in FIG. 3.

In some embodiments, the server system 107 may be configured to receive data regarding operator status directly from the operator monitoring device 101 and/or by way of the vehicle base station 103 and the like. The server system 107 may also be configured to receive vehicle data from the vehicle base station 103 and the like. Further, the server system 107 may be configured to train and/or update the artificial intelligence module of the vehicle base station 103 and the like. The server system 107 is further discussed in FIG. 4. Alternatively, the server system 107 may include an artificial intelligence module for the vehicle base station 103.

Figure 2:
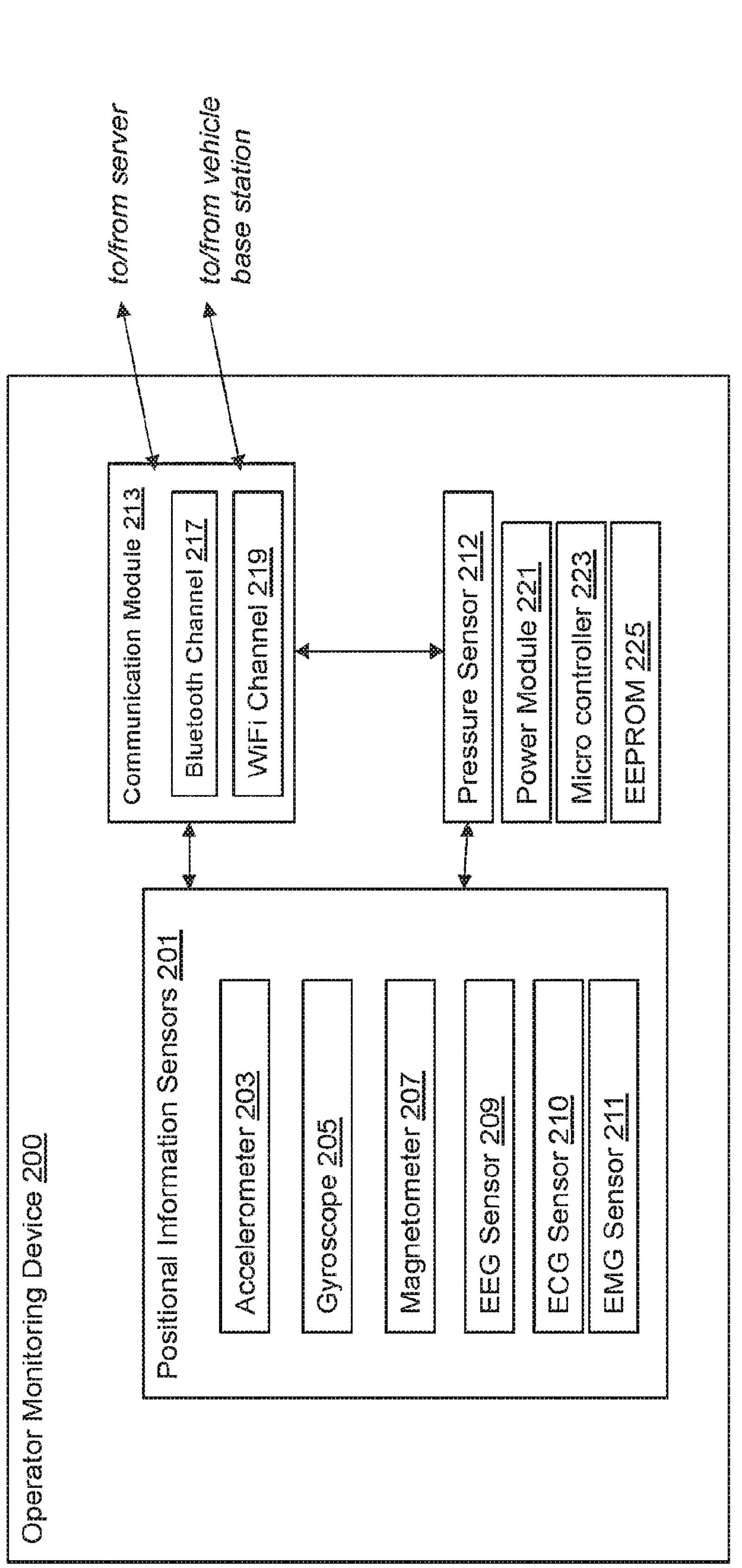
FIG. 2 provides a block diagram for an operator monitoring device, built in accordance with aspects of the present disclosure.

FIG. 2 illustrates an operator monitoring device. As illustrated in FIG. 2, the operator monitoring device 200 may include positional information sensors 201 that indicate the position of the operator. These positional information sensors 201 may include but are not limited to, an accelerometer 203, gyroscope 205, magnetometer 207, electroencephalography (EEG) sensor 209, electrocardiogram (ECG) sensor 210 and/or an electromyography (EMG) sensor 211, pressure sensor 212, and the like.

In some embodiments, the positional information sensors 201 may include sensors that provide information for the operator position corresponding to the nine degrees of freedom and the like. For example, the accelerometer 203 may be a 3-axis low-g accelerator, the gyroscope 205 may be a low power 3-axis gyroscope, and the magnetometer 207 may be a 3-axis geomagnetic sensor.

In some embodiments, the positional information sensors 201 that indicate position of the operator may include a set of biosensors that are configured to capture electrical activity of the human body. The operator position may determined based on the recorded electrical activity of the human body. For example, the operator monitoring device 200 may include one or more bioelectrodes that are configured to record electrical activity from the human body. The bioelectrodes may be positioned to record from the ear canal, from the back of the operator's ear, or any other suitable location for recording electrical activity from the human body.

The signals obtained from the bioelectrodes may be processed using signal processing techniques such as filtering into signals that are transmitted into an EEG sensor 209, EMG sensor 210, and/or EMG sensor 211. In some embodiments, data received by the positional information sensors 201 may be processed based on their quality and completeness of the data being received by the respective sensors as well as the type of signal most indicative of operator fatigue and alertness.

For example, in some embodiments, the EEG sensor 209, the ECG sensor 110 and/or the EMG sensor 211 may include dry type sensors that are positioned within the operator monitoring device 200 to have contact with the skin surface for recording of brain, heart, and/or muscle activity.

The EEG sensor 209 may be configured to measure electrical activity generated by the synchronized activity of thousands of neurons (in volts) and the like. It may provide excellent time resolution, allowing for the detection of activity within cortical areas, even at sub-second timescales and the like. As the voltage fluctuations measured at the electrodes are very small, the recorded data may be digitized and sent to an amplifier and the like. The amplified data can then be displayed as a sequence of voltage values and the like. The EEG amplifiers may convert the weak signals from the brain into a more discernible signal for the output device and the like. There are differential amplifiers that are useful when measuring relatively low-level signals and the like.

The ECG sensor 210 may be configured to measure electrical activity generated by the heart. These obtained signals may be used to clean EEG signals as they may produce artifacts in an EEG reading. Accordingly, the data obtained by the ECG signal may be used to clean the signal obtained by the EEG signal. In some embodiments, various techniques may be used to obtain the ECG signal from the bioelectrodes including for example, techniques for determining the QRS signal such as the Pan-Tompkins algorithm, Hamilton-Tompkins algorithm, Christov algorithm, Engelse-Zeelenberg algorithm, stationary wavelet transform and the like. In some embodiments, these techniques may be used extract R-peaks from the QRS data and help in monitoring various variables such as heart rate, rhythm, and the like, and remove the impact of the heart rate, rhythm, and the like, from the obtained EEG and EMG data.

The EMG sensor 211 may be configured to measure electrical activity generated by stimulation of the muscle of interest by its respective nerves. It may provide excellent time resolution allowing for detection of activity within the muscle of interest even at sub-second time scale. The voltage fluctuations are measured at the electrodes from different zones of the muscle and differential signal is recorded and processed.

Digital signal processing technology may be used to develop multiple signatures and its functional logics from the EEG sensor data, ECG sensor data, and EMG sensor data for further processing and the like. For example, EEG/EMG sensor data may include noisy signals and the like. EEG/EMG sensor data may also include various other bio-electric signals such as brain signals that may be superimposed along with the signal of interest and the like. Accordingly, the EEG/EMG sensor data may be pre-processed by applying algorithms such as electrooculogram artefact correction and the like. In some embodiments, the EEG/EMG sensor data may be pre-processed by removing signals obtained from the ECG sensor. The EEG/EMG sensor data may also be pre-processed by removing alternating current frequencies, such as by applying a 50 Hz, followed by filtering direct current components having high amplitudes with zero frequencies and electrooculogram artefact correction. Once the EEG/EMG sensor data is pre-processed, gesture patterns may be determined from the resulting EEG/EMG sensor data, by analyzing the time and frequency domain properties of the signals related to the EEG/EMG sensor data. The resulting signals can be segmented into epochs lasting a few seconds, and then feature extraction algorithms may be applied to each segmented epoch and the like. Classifiers may then be run on the extracted features. After signal denoising, features may be extracted by employing techniques like identifying time domain features (e.g., mean, standard deviation) or frequency domain features (e.g., Fast Fourier Transforms, wavelets) and the like. For example, the system may be configured to create the features in time domain that explain the central tendency, spread and auto correlation of extracted signal data. For example, in some embodiments, wavelet analysis that preserves both time domain and frequency domain features may be used and the like. Once features are extracted, the most relevant features may be selected using dimensionality reduction techniques like PCA (principle component analysis). Further, the most important features may be selected by using an ensemble classifier (e.g., Random forest) and select the features with highest importance if there is binary classification problem. In this manner, the system may build a classifier using ensemble techniques (e.g., Random forest or XGBoost) or other machine learning algorithms.

In some embodiments, at least a portion of the digital signal processing may be conducted at the operator monitoring device and the like. In some embodiments, a second portion of digital signal processing may be conducted at the vehicle base station and the like. Signal processing and pre-processing of the EEG signal may be conducted at either device depending on the required computational complexity involved.

The operator monitoring device 200 may be configured to continuously monitor an operator and determine if they are in a state of reduced alertness and/or fatigue using the positional information sensors 201 and the like. For example, the operator monitoring device may be configured to determine if the operator is frequently yawning, having difficulty in keeping their eyes focused, constant head nodding, has changes in eye blinking, is daydreaming or zoning out, and the like. Using the in-built positional information sensors 201 the operator monitoring device may be used to determine the real time head position of a user in three-dimensional space and the like. In some embodiments, the operator monitoring device 200 may be used in connection with a vehicle base station that determines data related to the vehicle moving direction. Accordingly, when the operator monitoring device 200 is used with the vehicle base station, the operator head position may be determined in the three-dimensional space within which the operator operates (e.g., cockpit, engine room, etc.). The operator monitoring device 200 may use this operator head position data to monitor operator status and track operator vigilance. For example, the system may be configured to ensure that an operator is active, is performing their function, and responsive to alarms generated based on vehicle speed and operator responsiveness.

In some embodiments the operator monitoring device 200 may be configured to determine if an operator is in a state of reduced alertness and/or fatigue by determining if the operator is yawning frequently. To determine if the operator is yawning frequently, the EMG sensor 211 of the operator monitoring device may be configured to identify electrical changes in the masseter muscle causing the action. Further the EEG sensor 209 of the operator monitoring device may be configured to identify electrical changes that take place in the central nervous system associated with yawning and the like. Still further, electrical readings obtained by the surface bio-electrodes from the nerves innervating the muscles of interest can further help ascertain if the operator is yawning frequently and the like.

In some embodiments the operator monitoring device 200 may be configured to determine if an operator is in a state of reduced alertness and/or fatigue by determining if the operator is having difficulty keeping their eyes focused and the like. To determine if the operator is having difficulty keeping their eyes focused, the accelerometer 203, gyroscope 205 and magnetometer 207 of the operator monitoring device may be used to assess the frequency of deviation in the axis of eyesight from its initial or set position and back to the same position.

In some embodiments the operator monitoring device 200 may be configured to determine if an operator is in a state of reduced alertness and/or fatigue by determining if the operator is constantly nodding their head. To determine if the operator is constantly nodding their head, which is a sign of fatigue, the accelerometer 203, gyroscope 205 and magnetometer 207 of the operator monitoring device 200 may assess the deviation in head position from its standard position as well as frequent rocking motion of the head of the operator and the like.

In some embodiments the operator monitoring device 200 may be configured to determine if an operator is in a state of reduced alertness and/or fatigue by determining if the operator has increased or decreased rates of eye blinking and the like. To determine if the operator has increased or decreased rates of eye blinking, which can also be a sign of fatigue, electrical readings obtained by the EMG sensor 211 and/or EEG sensor 209 from the respective nerves can be used to determine the rate of eye blinking and/or frowning of the eyebrows and the like. Further the EEG sensor 209 of the operator monitoring device may be configured to identify electrical changes that take place in the central nervous system associated with increased and/or decreased rates of eye blinking and the like.

Additionally, in some embodiments the operator monitoring device 200 may be configured to determine if an operator is in a state of reduced alertness and/or fatigue by determining if the operator is daydreaming or zoning out and the like. To determine if the operator is daydreaming or zoning out, the accelerometer 203, gyroscope 205 and/or magnetometer 207 of the operator monitoring device may be used to identify a change in the line of sight from the normal axis when maintained at the new axis for a prolonged period of time and the like. Additionally, the EEG sensor 209 may be used to identify electrical changes in the central nervous system associated with daydreaming and/or zoning out and the like.

In some embodiments, the operator monitoring device 200 may be used for continuous real time monitoring of the electrical activity of the central nervous system for health monitoring with respect to sleep monitoring, seizure detection, and the like. Further, in some embodiments, the operator monitoring device may be used to extract basic ECG signals from the bioelectrodes to help monitor heart rate, rhythm, and the like. For example, the device may be used to monitor for arrythmias and the like.

In some embodiments, the operator monitoring device 200 may generate operator head positional data. The operator head positional data may include data from positional information sensors 201 such as a combined inertial motion unit that includes accelerometer 203, gyroscope 205, and magnetometer 207. The operator head positional data may determine an operator's head position with respect to the a vehicle base station by determining the position of the combined inertial motion unit of the operator monitoring device (e.g., earbud), with an inertial motion unit of the vehicle base station, as described below. The data from the combined inertial motion unit of the operator monitoring device 200 which includes the accelerometer 203, gyroscope 205, and magnetometer 207 may be combined with biosensor data including that from the EEG sensor 209, ECG sensor 210, and/or EMG sensor 211 to determine operator position and/or whether an operator is in an alert, fatigued, or altered attention state.

The operator monitoring device 200 may also include a communication module 213 configured to allow the operator monitoring device 200 to communicate with a vehicle base station and/or server system. In some embodiments, the communication module 213 may include one or more of a Bluetooth® channel 217 and/or a Wi-Fi® channel 219 and the like. The Bluetooth® channel may be used as the primary means of communication between the operator monitoring device 200 and a vehicle base station and the like. However, the operator monitoring device 200 may also be equipped with an additional Wi-Fi® communication channel 219 in case any primary Bluetooth® channel 217 failure between the vehicle base station and the operator monitoring device 200 occurs and the like. In some embodiments the Wi-FI® communication channel 219 utilizes standard 2.4 GHz free band Wi-Fi® and the like.

Additionally, the operator monitoring device 200 may include a power module 221. The power module 221 may include a rechargeable lithium-ion battery and the like. In some embodiments, the operator monitoring device 200 may include a power module 221 configured to power the positional sensors and the like. In some embodiments, the power module 221 may include a converter power supply circuit that can generate multiple voltages from the fixed battery voltage to provide power to all the onboard components and their dynamic behavior requirements and the like. Further, in some embodiments, the power module 221 may optionally interface with a USB socket. In particular, the USB socket may be used for the charging of the lithium-ion battery of the power module 221.

In some embodiments the operator monitoring device 200 may include a micro controller 223. The micro controller 223 may be configured to store the overall application and functional logic for the operator monitoring device and the like. In some embodiments, the micro controller 223 may include one or more of a serial peripheral interface (SPI), analog to digital converter (ADC), digital input/output (DIO), inter-integrated circuit (I2C) and internal fast Fourier transform (FFT), the combination of which is configured to allow for the real time acquisition of data from various positional information sensors 201 and computation of critical logic and the like. The computed functional logic may then be output via the Bluetooth® component to the server system and/or the vehicle base station and the like.

In some embodiments, the micro controller 223 may be further configured to require very low power consumption and be compact in size, while at the same time allowing for the computational requirements for the sensors and the like as discussed above. In some embodiments, the system may allow for built-in signal processing, floating point computations and reduced response time and the like. In some embodiments, the micro controller 223 may be part of an open architecture system that is capable of interfacing with multiple configurations and applications and the like.

In some embodiments, the micro controller 223 and the Bluetooth® channel 217 may form a customized combined unit that is capable of data acquisition and communication and the like. For example, the Bluetooth® channel 217 may serve as the main communication channel between the operator monitoring device 200 and a vehicle base station and the like. The Bluetooth® channel 217 may be configured to transmit the acquired real time data indicative of operator status and return back audio alarm signals and the like. In some embodiments, the Bluetooth® channel may include Bluetooth® 5.1 low energy proprietary 2.4 GHz and a microcontroller to capture data from sensor devices and to transmit data. In some embodiments the software protocol stack may be integrated with the operator monitoring device with very low power. The micro controller 223's SPI channel may be used to acquire real time data from various sensors or the like. In some embodiments, the Bluetooth® channel may be configured to transmit data to the vehicle base station from the operator monitoring device at suitable intervals, for example, between about 300 milliseconds and 1,000 milliseconds or the like. In some embodiments, packets of data are pushed from the operator monitoring device to the vehicle base station every 100 milliseconds or the like.

In some embodiments the operator monitoring device 200 may include an electrically erasable programmable read-only memory (EEPROM) 225 configured to store user specific data and learned practice and the like. The EEPROM 225 may be configured to acquire and store real time user positional data with predefined user settings and the like. The EEPROM 225 data may then be transferred through Bluetooth® channel 217 to the vehicle base station for further processing and the like. In some embodiments, a portion of the training and pre-set practices of operator may be stored in EEPROM, which become a reference for the vehicle base station to establish further processing of main machine objective functions for the artificial-intelligence-based module. The EEPROM 225 may also be configured to store specific configuration parameters required for a given application and the like.

Additionally, in some embodiments, the operator monitoring device 200 may also include a speaker 227 such as a piezo-electric speaker or the like. The speaker may be used to receive audible alarms generated by the vehicle base station or the like. For example, the vehicle base station may store pre-recorded audio messages that may be triggered by a determination that the operator is in a state of reduced alertness and/or fatigue or the like. The pre-recorded audio messages may be stored in the EEPROM and/or a memory component of the vehicle base station.

In some embodiments, the operator monitoring device 200 may be configured as an earbud or earpiece that is configured to be inserted in the ear of an operator. In an alternative embodiment, the operator monitoring device 200 may be configured to be placed and mounted behind the ear like a hearing aid device. The earbud operator monitoring device 200 may include the sensors described above to capture operator head movement in three-dimensional space. Additionally, the operator monitoring device 200 may be capable of detecting micro-gestures from variations in pressure detected in the ear canal, variations in the EEG signal, variations in the ECG signal, and/or variations in the EMG signal.

In some embodiments, the operator monitoring device 200 may be configured to have a small footprint with built-in timing capabilities configured to synchronize with highly accurate sensor data from the positional information sensors with great time resolution (e.g., a time stamp of 39 microseconds).

In some embodiments, the operator monitoring device 200 may also include a pressure sensor 212 and the like. The pressure sensor 212 may be capable of detecting pressure within the ear canal and the like. The pressure sensor 212 may be used to detect face related movements such as a jaw clench, or yawn. In some embodiments, these gestures may result micro level pressure variations that can be considered and computed as a primer for functional logic to activate further actions taken by the operator monitoring device, or the vehicle base station. In some embodiments, the pressure sensor 212 or the like may include a high precision digital pressure sensor configured to measure pressure in the range of 300 to 1100 hPa with a relative accuracy of +/−0.12 hPa and absolute accuracy of +/−1 hPa. The pressure sensor 212 or the like may be further configured to utilize only tiny and micro amp current consumption with 1 Hz sampling rate device. Accordingly, the pressure sensor 212 adds value in being light weight, requiring low power consumption, and easily packageable within an earbud. In some embodiments, the pressure sensor 212 may utilize statistical inferences to determine deviations from an acceptable range or the like.

In some embodiments, data from the EEG and EMG sensors may be used to determine if a person is drowsy, fatigued, and the like. Like the manner in which a jaw clench can be detected by EEG and/or EMG sensors, the EEG sensors may be useful to identify the nerve impulse generated in the motor cortex and provide a signal based on amplitude and frequency for further use or the like. The EMG sensors may be useful to identify the electrical changes taking place during the contraction of the muscle fibers and provide a signal which can be used for further use or the like.

In some embodiments, the operator monitoring device 200 may also include a low-noise filter (not shown). The low-noise filter may allow the power supply circuit to function with sensitive components without being affected by noise due to battery voltage variations and static charge originated from the human body or the like.

In some embodiments, the operator monitoring device 200 may include one or more noise filters capable of filtering noise from data obtained from the positional sensors or the like. For example, while general accelerometer data is noisy, it may be capable of giving persistent results over longer periods of time, especially when a subject is moving. Additionally, accelerometer data may be compensated with magnetometer data or the like. In some embodiments, a magnetometer can be used to calculate the yaw which works based on the Earth's magnetic field or the like. To calculate the altitude, the disclosed embodiments may use a Directional Cosine Matrix (DCM), but as these sensors are noisy under the influence of external forces, these can be complemented with a gyroscope or the like. Gyroscopes are more precise but will have a problem of drift over some period of time as it uses angular velocity changes to calculate position and does not have a fixed reference or the like. Accordingly, fusing the data from all these sensors including gyroscopes, magnetometer, and accelerometers or the like, may be helpful in determining a DCM.

Additionally, as the data obtained by each sensor may include some noise associated with the measurement, the noise may need to be removed by applying low pass and/or high pass filters or the like. A complimentary filter is a simple way to combine sensors, as it is a linear function of a high pass gyroscope filter and low pass accelerometer filter or the like. Noisy accelerometer data with high frequencies are therefore filtered out in the short-term and smoothed out by smoother gyroscope reading or the like. A Kalman filter or extended Kalman filter may be used which may utilize previous values to find a future estimate by varying an averaging factor to optimize converging on the actual signal or the like. Alternatively, or additionally, Mahony or Madgwick filters may be used. Before applying the filters, individual sensors may require calibration and to be compensated for misalignment errors and the like.

In some embodiments, one or more bioelectrodes may obtain a combined signal from the operator that may then be filtered into respective signals for each of the EEG Sensor 209, EMG Sensor 211, and ECG sensor 210. The respective filtered signals for each of the EEG Sensor 209, EMG Sensor 211 and ECG sensor 210 may then be used in connection with the data from the accelerometer 203, gyroscope 205, and magnetometer 207.

Figure 3:
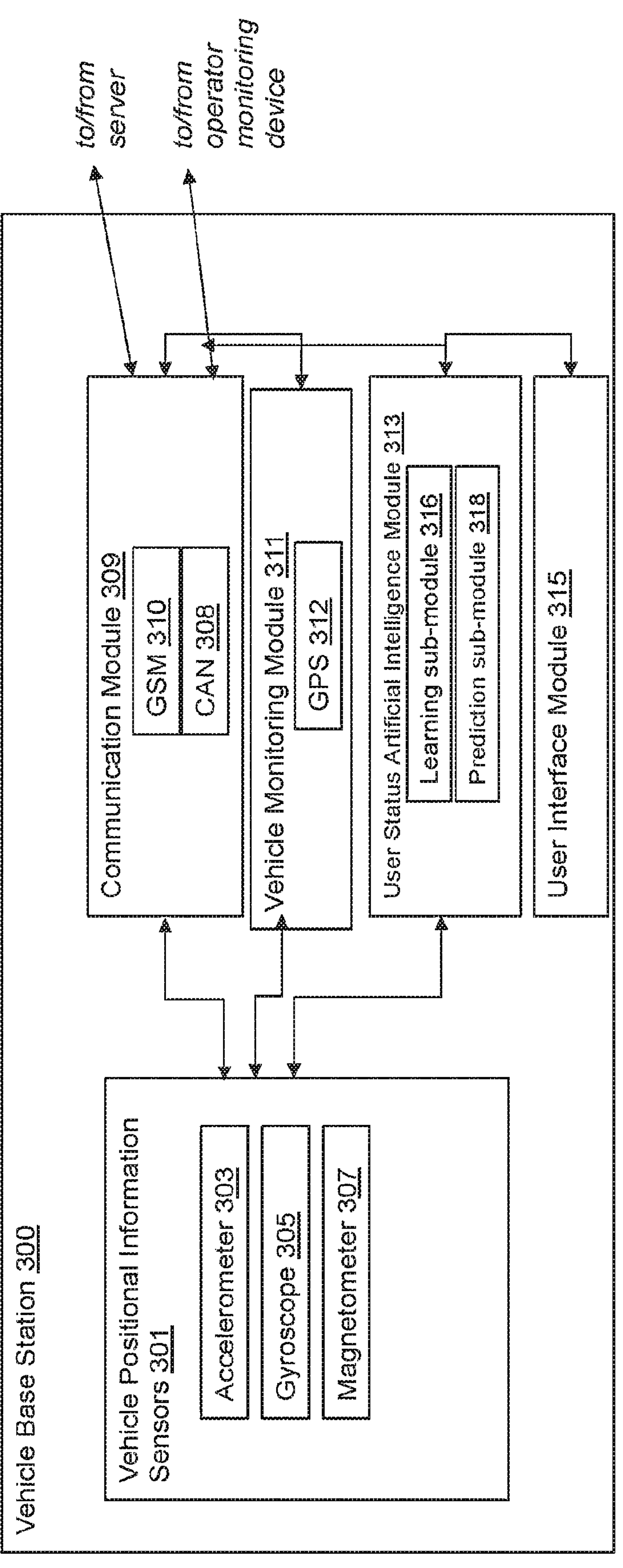
FIG. 3 provides a block diagram for a vehicle base station, built in accordance with aspects of the present disclosure.

FIG. 3 illustrates a vehicle base station. The vehicle base station 300 may be a secondary device that is stationary or fixed to the vehicle or the like (i.e., car console, train console). Alternative, the vehicle base station may be a secondary device that is portable and capable of being integrated into the vehicle or the like (i.e., tablet, mobile phone). In some embodiments, the vehicle base station may form part of a dashboard unit in a vehicle such as a locomotive, train, automotive vehicle, truck, airplane, ship, machine and the like. Although a vehicle and vehicle base station are mentioned, the vehicle base station can be positioned on any moving object, without limitation. For example, the vehicle base station can be used on tractors, locomotives, airplanes, fighter jets, and the like.

As illustrated in FIG. 3, the vehicle base station 300 may include vehicle positional information sensors 301 including, for example, an inertial motion unit configured to determine nine degrees of freedom or the like. The vehicle positional information sensors 301 may include an accelerometer 303 such as a 3-axis low-g accelerometer, a gyroscope 305 such as a low power 3-axis gyroscope, and a magnetometer 307 such as a 3-axis geomagnetic sensor or the like. In some embodiments, the vehicle base station 300 may be configured to compare positional information determined by the vehicle positional information sensor 301 with the operator positional data determined by the operator monitoring device or the like. In other words, the inertial motion signal from the operator monitoring device may be determined with respect to the fixed reference obtained from the vehicle positional information sensor or the like. In some embodiments the vehicle positional information sensor and the operator monitoring device may operate in continuous calibration mode to determine operator head position in the three-dimensional space or the like. The vehicle base station 300 may apply an intelligent algorithm by way of a user status artificial intelligence module 313 that is customized to determine operator head position based on three-dimensional space in the cabin and to determine expected position of operator for a given application or the like. In some embodiments, statistical inferences may be applied to the signals obtained by the inertial motion sensor and/or pressure sensor of the vehicle base station 300 or the like.

The vehicle base station 300 may be configured to receive processed or raw data from the one or more sensors in the operator monitoring device such as operator monitoring device 200 and determine the operator's posture and estimate deviations based on stated or predefined target function thereby assessing the focus and/or attentiveness of the operator or the like. In some embodiments, the operator's posture and deviations may be determined based on input from both of the vehicle base station and the operator monitoring device or the like.

For example, the vehicle base station may receive data from an operator monitoring device such as operator monitoring device 200 of FIG. 2, including operator positional data from a gyroscope, accelerometer, magnetometer, EEG Sensors, ECG Sensors, and EMG Sensors, and the like. The vehicle base station 300 may receive the operator positional data and compare it with one or more sensors present in a static on-board base station and the like.

For example, in some embodiments, the vehicle base station 303 and more particularly, the user status artificial intelligence module 313, may be configured to determine whether the operator position fits within a predefined normal range. This may be done by determining the position, including the distance, angle, roll, pitch, and/or yaw of the operator monitoring device 200 with respect to the vehicle base station 300. This may be determined based on a comparison of the data obtained by the accelerometer, gyroscope and magnetometer on the operator monitoring device to the data obtained by the accelerometer 303, gyroscope 305, and magnetometer 307 on the vehicle monitoring device. The operator position may correspond to operator head position and operator eye position.

The operator position data may be augmented with biosensor data from the ECG sensor, EMG sensor, and EEG sensors of the operator monitoring device, in that the biosensor data may further indicate whether the operator is alert or in a state of reduced alertness. In some embodiments, the user status artificial intelligence module 313 may determine user status (e.g., user is alert, or user is in a state of reduced alertness) based on one or more of the the biosensor data and the user positional data.

If a deviation in operator position is identified, the vehicle base station may take further action such as, alerting the operator using light and/or sound, implementing a pre-configured plan to mitigate and/or prevent incidents, and/or transmitting an alert to a central server system or the like. In some embodiments, deviation in operator position may be determined based on the operator's positional information such as roll, yaw, and pitch along a preconfigured viewing grid. For example, in some embodiments, the operator monitoring device may be initialized based on the operator's sitting posture and a viewing grid area corresponding to the viewing ability of the operator in that position may be determined or the like. Any deviation in the operator's sitting posture that prevents them from being able to view the entire viewing grid area may be determined based on the operator's current positional information such as roll, yaw, and pitch or the like. Accordingly, any deviation in the operator's position that moves them out of the viewing grid area may trigger a pre-configured plan or the like. In some embodiments, the pre-configured plan may include steps needed to bring the vehicle to a safe position or the like. For example, in a locomotive setting, the pre-configured plan may involve deployment of the penalty brake which commands the locomotive control computer to come to a stop or the like.

In some embodiments, the vehicle base station 300 may be configured to include a user status artificial intelligence module 313 or the like. The user status artificial intelligence module may be configured to determine whether an operator's gestures fall into a range of normal gestures, indicative of attentive operation of the vehicle, or outside of the range of normal gestures, indicative of inattentive operation of the vehicle. In some embodiments, the user status artificial intelligence module 313 may require operator device positional information, operator bio-signals, and vehicle positional data. In some embodiments, the user status artificial intelligence module 313 may include two sub-modules: a learning module 316, and a prediction module 318.

In some embodiments, the learning module 313 may be configured to prepare a gesture classification algorithm from training data extracted from a population of operators. For example, data extraction may include extracting data from biosensors such as ECG sensors, EMG sensors, and EEG sensors. The extracted biosensor data for the population of operators may be used to create different gesture profiles which may then be stored in a memory or repository. The gesture profiles may include data corresponding to three channels resembling electrode amplitude values. The extracted biosensor data may be pre-processed by techniques such as high pass and notch filters for removing direct current components, frequencies less than 1 Hz and alternating current frequencies. After the extracted biosensor data is pre-processed the population gestural data may be standardized and labeled, so that the population gestural data may be used as training data, without bias. In a next step, features for each of the extracted gestural traces, may be created at label instance and channel levels. Examples of features include, without limitation, time domain features such as standard deviation, skewness, kurtosis, mean, mean absolute deviate, along with frequency domain features such as power at different EEG frequency bands, peak frequencies, and the like. The extracted features may be used to train a machine learning or deep learning multi-class classification model that is configured to identify gestures from a received data set. In some embodiments, the machine learning model may include an ensemble algorithm such as a random forest algorithm. In some embodiments, the random forest algorithm may be trained with approximately one hundred estimators and a depth size of 5. Alternatively, or additionally, ensemble algorithms such as XGBoost, or neural networks such as multilayer perceptrons, convolutional neural networks may be used. In some embodiments, a random forest algorithm may be used to reduce processing complexity and power requirements on the operator monitoring device or the vehicle base station. The machine learning model may be evaluated based on its accuracy, precision, and recall. The learning sub-module 316 may be used to generate and/or update a gesture classification algorithm from training data extracted from a population of operator prediction algorithm. The gesture classification algorithm may be extracted and saved as a .CSV, json, .pkl or other suitable file format.

The prediction sub-module 318 may include the gesture classification algorithm output by the learning sub-module 316. The prediction sub-module 318 may be configured to perform real-time predictions on data received from the operator monitoring device 200 and the vehicle positional information sensors 301. Data received by the prediction sub-module 318 may be pre-processed by techniques such as high pass and notch filters for removing direct current components, frequencies less than 1 Hz and alternating current frequencies, and then standardized. Features may be extracted from the received data, and the gesture classification algorithm generated by the learning submodule 316 may be applied to the extracted features to determine if the operator is alert or in a reduced state of alertness.

Data regarding the operator status may be transmitted from the operator monitoring device to the vehicle base station, which may be configured to determine whether the operator status is indicative of a state of reduced alertness and/or fatigue by applying a trained artificial intelligence module, the user artificial intelligence module 313, to the operator status data received from the operator monitoring device or the like. In some embodiments, the artificial intelligence module may be capable of learning a particular operator's mannerisms and patterns, thereby providing a more sensitive and accurate determination regarding the operator's attentiveness or the like.

In some embodiments, the vehicle base station may also determine the status of the vehicle and integrate vehicle status data with operator's status data or the like. The integrated vehicle and operator status data may then be provided to a server system communicatively coupled to the vehicle base station or the like. For example, in some embodiments, head tracking data determined from the operator position data received from the operator monitoring device may be associated with time-stamps or the like. The time-stamps may be integrated into nine degree-of-freedom data stream which are provided to a central server or the like.

The user status artificial intelligence module 313 may be configured to apply machine learning techniques on the data it receives from the vehicle positional information sensors 301 and the operator positional information sensors 201. For example, in some embodiments, the user status artificial intelligence module 313 may be trained on operator gestures obtained from a first use of the disclosed system by an operator. During the training period, normal operator behavior during operation of the vehicle may be determined. This may include a range of gestures and positions for the operator monitoring device in relation to the vehicle base station that is indicative of normal operator positioning. In some embodiments, the range of gestures and positions may be updated at scheduled intervals, or responsive to false detections of reduced alertness. For example, before the start of a transport, the operator may be instructed to keep their head in a normal viewing position facing the windshield viewing direction while keying in commands at the vehicle base station or the like. In this manner, the operator position may be registered and a zero-axis within the three-dimensional space may be determined or the like. The process may be repeated several times (e.g., three times, five times) in order to create a baseline zero-axis. Further positional data for the operator position within the three-dimensional space may be estimated as variations from the calculated zero-axis or the like.

The vehicle base station 300 may include a communication module 309. The communication module 309 may include a plurality of Bluetooth® communication channels or the like. For example, a single vehicle base station 300 may include two separate Bluetooth® communication channels, each of which is configured to communicate with one an operator or co-operator of a vehicle (i.e., pilot and co-pilot) or the like. The Bluetooth® communication channel may be used to establish communication with an operator monitoring device to capture real time data generated by the operator monitoring device with regards to the operator alertness status, position and the like. In some embodiments, the Bluetooth® communication channel may utilize a Bluetooth 5.0 protocol, a Bluetooth® 5.1 protocol, or the like. In some embodiments, a single board computer may be configured to receive data from the operator monitoring device and further process the received data to determine operator status using a Bluetooth® communication channel or the like. If communication between the operator monitoring device and the vehicle base station is disrupted, real-time operator head-tracking or the like may be disrupted.

In some embodiments the communication module 309 may include a RS485 serial communication channel. In some embodiments, the communication module 309 may include a CAN interface 308 or the like. The CAN interface 308 may be used for vehicle applications to establish communication with any other on-board systems to meet various functional applications or the like. Functions, data structures and system level configurations are specific to each application or the like. The communications module 309 may also include a USB port for physical data downloading and program data uploading in the on-board equipment or the like. The communication module 309 may also include digital input and output channels, including those to provide audio and/or visual alarms or the like to an operator. The digital input and output channels may also be used to control the vehicle, such as by applying a penalty brake or disabling power command to maintain vehicle or machine or the like. All the digital inputs and output will be configured for specific application and internal control algorithms are designed to achieve objective function of the system or the like. The digital inputs and output may be configured at different voltage levels to meet specific applications or the like.

The vehicle base station 300 may also include a user status artificial intelligence module 313 or the like. The user status artificial intelligence module 313 may include one or more artificial intelligence and machine learning strategies to operator positional data and vehicle data to determine whether an operator is in a state of reduced alertness or the like. The operator positional data may be received from the operator monitoring device or the like. The vehicle data may be received by the vehicle base station 300 or obtained by sensors within the vehicle base station 300 including, without limitation, the vehicle positional information sensors 301 and/or parameters obtained by the vehicle monitoring module 311 or the like. In some embodiments, the user status artificial intelligence module 313 may apply a machine learning algorithm trained by the server system or the like. The user status artificial intelligence module 313 may also be capable of updating the machine learning algorithm based on received operator data, received vehicle data, commands from a server system, operator commands, system manager commands and the like.

In some embodiments, the user status artificial intelligence module 313 includes a machine learning module that may utilize an ensemble learning algorithm such as a rain forest learning algorithm or the like. In some embodiments, the user status artificial intelligence module 313 may be configured to update after an initial calibration and on a daily basis or the like. For example, logistic regression and classifiers, event discovery methods, genetic algorithms and chat-bot agent techniques may be used within the user status artificial intelligence module 313 or the like.

In some embodiments, the user status artificial intelligence module 313 is applied to data received from the pressures sensor of the operator monitoring device or the like. For example, the machine learning algorithm may be applied to the pressure data to differentiate between different gestures such as a jaw clench, blinking and nodding. For example, the user status artificial intelligence module 313 may utilize a continuous wavelet transform, and/or signature synthesizing methods or the like.

In some embodiments, the user status artificial intelligence module 313 may be applied to data from the operator monitoring device's positional information sensors and/or the vehicle base station's positional information sensors or the like. For example, a machine learning algorithm may be applied to the vector data associated with different gestures (e.g., move left, right, back, ahead, slow, fast) or the like. For example, the user status artificial intelligence module 313 may utilize logistic regression and classifiers, event discovery methods, genetic algorithms, chat-bot agent techniques and the like.

In some embodiments, the artificial intelligence module 313 may be applied to a signal that is smoothed using a moving window or the like. For example, the artificial intelligence module 313 may be applied to signals from the pressure sensor including statistically determined parameters such as the mean and standard deviation or the like. For example, an algorithm of the artificial intelligence module 313 may be configured to adaptively estimate the mean and standard deviation to be used for the quantization of the signal into peaks and valleys along with zero state over a window or the like. This in turn may be used to differentiate the actions that are possible based on how many peaks and valleys within the signal and the like.

In another example, the artificial intelligence module 313 may be applied to inertial motion signals from the inertial motion unit or the like. For example, the artificial intelligence module 313 may include an algorithm configured to determine the left and right movements based on the gradient or slope of a smoothened inertial motion unit signal or the like. In particular, the gradient of the signal from the inertial motion unit changes when there is movement of the head in any direction or the like. The slope of the inertial motion unit signal having a specific window size may be computed using a least square fit (individually for all the three components, for example, roll, pitch and yaw) or the like. Further, the raw signal may be converted to provide altitude information using a Madgwick filter or the like. When the module determines that the slope of the signal exceeds a threshold, the maxima between the three components may be determined in order to distinguish the event (e.g., left/right, up/down) and the like. The sign of the slope may then be used to determine the direction of the event or the like.

In some embodiments, the user status artificial intelligence module 313 may be trained on movement data collected in real-world or lab conditions or the like. For example, in lab conditions noise may be introduced into a movement signal to train for threshold identification and signature detection or the like.

In some embodiments, if the user status artificial intelligence module 313 determines that an operator status has deviated from acceptable positions which is indicative of a reduced state of alertness, the user status artificial intelligence module 313 may command the vehicle base station to provide an alert to the operator via the user interface module 315 or the like. Additionally, or alternatively, the vehicle base station may also communicate the deviation to the central server or the like. In some embodiments, the on-board equipment may generate a digital output signal to terminate machine activity for the vehicle and consider safety as the highest priority objective or the like. Any determined incidents may be logged and used for operator and/or machine learning training and/or post-processing analysis or the like. Incident reports including real-time data may be stored on a memory component of the vehicle base station 300 and then transferred to a central server for monitoring, rating, training and analysis purpose or the like.

The vehicle base station 300 may also include a vehicle monitoring module 311 that is configured to determine the location of the vehicle or the like. For example, the vehicle monitoring module 311 may include a GPS module 312 that is configured to determine the location of the moving vehicle or machine and log the corresponding coordinates (i.e., Latitude and Longitude coordinates) or the like whenever an error is logged. The corresponding coordinates may be transmitted to a central server along with error log or incident data with GPS coordinates for post process analysis. For example, if repetitive logs in the same location from multiple vehicle or multiple operators may indicate a locational error or the like.

In some embodiments, the vehicle monitoring module 311 will interface with a communication module 309 which includes a GSM communication channel 310 or the like. The GSM communication channel 310 may include a dual channel that is configured to establish data communication as a redundancy option for data transfer to the server or the like. Data corresponding to the entire vehicle journey captured in real time, computed algorithm outputs from the machine learning module, error logs, moving vehicle and machine position information, alarm trigger points, mission termination logs, driver and operator drowsiness logs and real time movement of drivers with in the cab will be transferred to server for monitoring, rating, training and post process analysis purpose or the like.

The combined GPS and GSM data for the vehicle monitoring module 311 and communication module 309 may be used for asset tracking and communication with a central server. In some embodiments, the vehicle base station 300 may continuously communicate with a central server to provide asset tracking capabilities and to provide real time data regarding operator and vehicle status through GSM communication channel to central control office for various purposes or the like. Real time data acquired from the operator monitoring device through the vehicle base station equipment may be configured with many applications within the server for driver performance monitoring, error tracking, health monitoring, position information as part of asset management function, and the like. Various application and data visualization models on the server system may utilize the captured data and the like. The periodicity of data transfer from the vehicle base station 300 to the central server may be defined in accordance with application demand or the like. For example, in some embodiments, inertial motion data from the operator monitoring device and vehicle base station may be realized to build virtual reality applications to cross check that real operator vigilance functions are properly tracked or the like. In some embodiments, the data from the vehicle base station may be pushed to the server system on the order of one time per minute or the like.

In some embodiments, the vehicle base station 300 may include a standalone system that has a plurality of digital input and output channels configured to capture machine inputs and generate digital output signal as an indication for the operator or the like. In some embodiments, some of the digital output channels may be interfaced with machine circuit to terminate machine activity on some safety condition responsive to a determination from the machine learning algorithm that an operator is in a reduced state of alertness or the like.

In some embodiments, the vehicle base station 300 may include a user interface module 315 that is configured with an LCD display and/or touch screen feature configured to receive operator or user input or the like. Additionally, the display may be configured to provide information to the operator using video messages, text messages, visual alarms and audio alarms. In some embodiments, the user interface module 315 may be placed on a vehicle base station area such as on an operator's desk within main operator's access range to feed required data and to view real time functional data on screen or the like.

In some embodiments, the vehicle base station 300 may be integrated with an on-board computing system that is programmed to provide the functionality discussed above. For example, an on-board computer may be programmed to meet machine objective functions and safety functions of the machine with above mentioned interfaces, high performance and high-speed processor-based computer with both program and data memory space, Windows® embedded C or Win CE operating system as the backbone to run the complete machine strategies or the like.

In some embodiments, the vehicle base station 300 may include an optional configuration setting keypad configured such that a user may enter in a requested configuration for their operator monitoring device or the like. The configuration setting keypad may also be available for receiving override input from an operator or the like. Additionally, the configuration setting keypad may be used by the operator in the vehicle for initial calibration including setting the data view setting configuration or the like. Further, the configuration setting keyboard may include an override option key configured to stop operation of the vehicle or machine or the like.

In some embodiments, the vehicle base station 300 may be powered by the vehicle. For example, a 72V and/or 110V power source is available from locomotive or train, and a 24V power source is available in most automotive vehicles. The vehicle base station's internal hardware architecture and its power control logics may be built based on this main power source or the like. Accordingly, the vehicle base station 300 may include any required DC to DC conversion so that the sensors and equipment described herein is able to function within the vehicle base station or the like.

Figure 4:
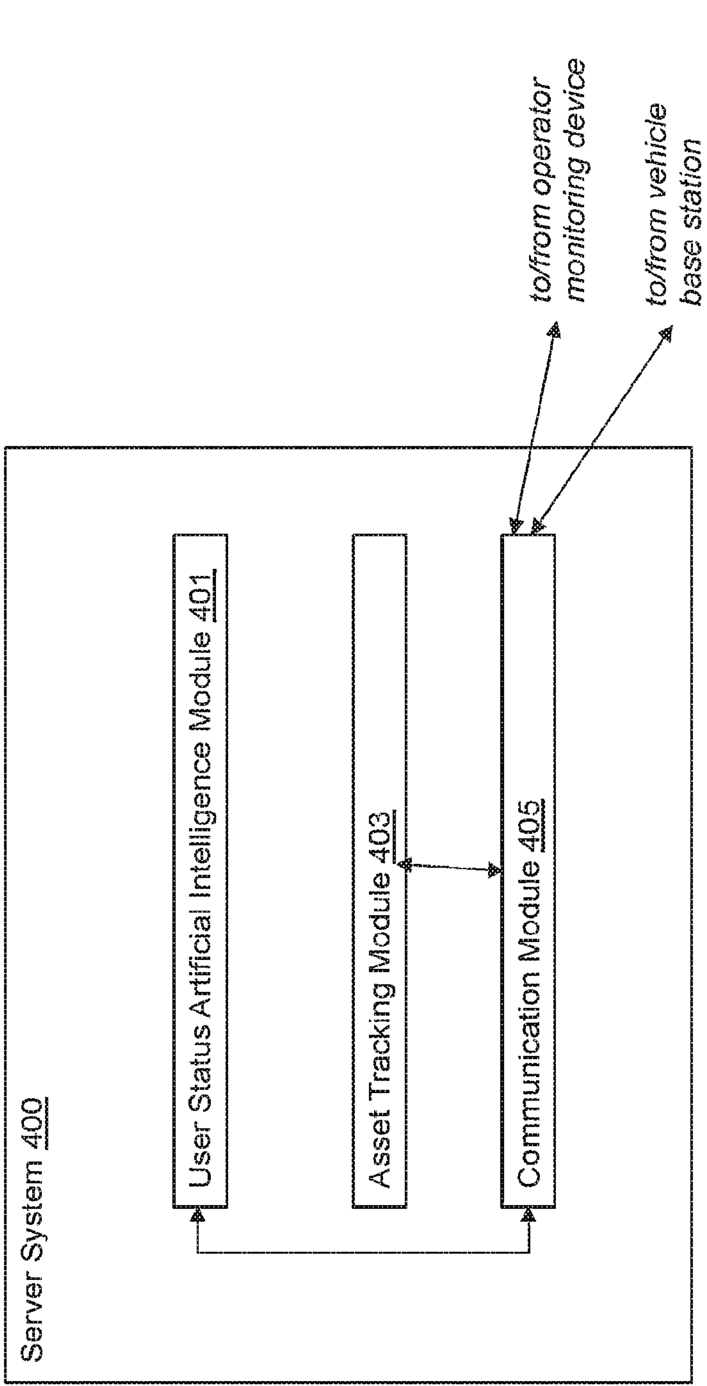
FIG. 4 provides a block diagram for a server system, built in accordance with aspects of the present disclosure.

As illustrated in FIG. 4, in some embodiments, the systems described herein may include a server system 400. The server system may include an asset tracking module 403 configured to provide asset management and tracking of all vehicles within a greater system with the like. Further, the server system may include a user status artificial intelligence module generator 401 configured to train and configure the artificial intelligence-based algorithm which is provided at each vehicle base station or the like. In some embodiments, the server system 400 may be embodied in a cloud computing system or the like.

In some embodiments, the user status artificial intelligence module generator 401 may be configured to generate the initial machine learning algorithm and calibrate the initial machine learning algorithm using forced learning or the like. The algorithm may then be updated on a daily basis on the vehicle base station using a "rain forest" algorithm or the like. For example, the "rain forest" algorithm may be trained on operator positional data, for example, the roll, yaw, and pitch data related to operator position as measured from the initialized viewing grid or the like.

In some embodiments, the vehicle base station may provide the server system 400 with nine degree-of-freedom data stream which includes operator positional data integrated with time-stamps or the like. The received data may be stored in a database communicatively coupled to the server 400 in a proprietary file type that cannot be edited or the like. The files including operator positional data may be used for post-incident reports or the like.

In some embodiments, the server system 400 may be used as an asset tracking module 403 that is configured to provide central control and monitoring or the like. For example, the server system 400 may receive data to track moving vehicles and machines and utilize real time location information for asset tracking or fleet management function or the like. The server system may provide a virtual realization for real time monitoring or the like. Alternatively, the server system may receive data after a time lag or the like. The server system may be configured to provide post-processing on data received by the server system or the like.

In some embodiments, the server system 400 may have an asset tracking module 403 that is configured to share information and data regarding vehicle location with organizations that can access real time operator vigilance and fatigue of each operator using a unique code or the like. The asset tracking module 403 may be configured to receive vehicle location data and include a cloud-based backend system that stores and displays the received vehicle location data. The asset tracking module 403 may be configured to provide, without limitation, machine monitoring with real time location of machine and its functional and operational data, operator vigilance and fatigue data specific to machine and operator, an error log and detailed fault analysis report, real-time and post-process virtual reality of machine operator movement for a given period, real-time mission termination logs through email alert or SMS alert or notification alert to respective operational and control owners, operator drive and performance data logs, fleet management function as an optional feature, training module and simulation module for operator response to various conditions, data storage for a required number of years, and a report generation module or the like. For example, the server system may communicate with machine servers, data base servers, back up servers, application servers, web portal servers and back end control office to manage continuous real time operations or the like. Additionally, the server system may perform fleet management functions that require communication to maintenance and/or safety monitoring teams to indicate corrective and/or preventive actions are needed or the like. For example, other vehicles in the system and those in proximity may be warned of a problematic or non-responsive operator.

In some embodiments, communication between the server system 400 and the user status artificial intelligence module 401 and/or the asset tracking module 403 may be mediated by a communication module 405, configured to facilitate communication between different modules of the server system, the vehicle base station and/or the operator monitoring device.

Figure 5:
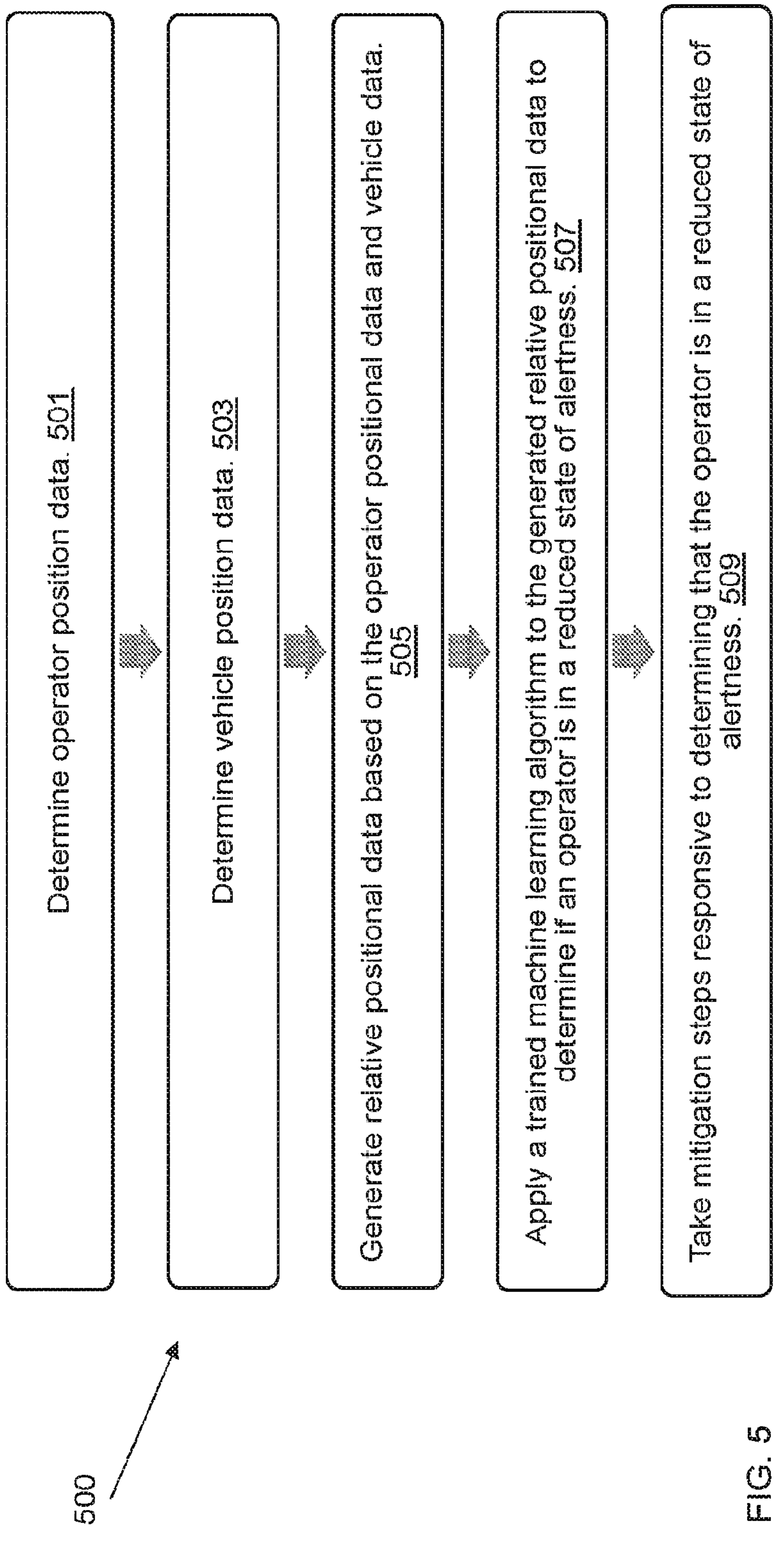
FIG. 5 provides a flowchart for a method performed in accordance with aspects of the present disclosure.

FIG. 5 illustrates a method 500 for a system built in accordance with the present disclosure. As illustrated in FIG. 5, in a first step, the system may determine operator position data 501. For example, the operator monitoring device may determine operator positional data based on EEG, EMG, accelerometer, magnetometer and gyroscope data or the like. In a second step, a vehicle base station may determine vehicle position data 503 or the like. For example, the vehicle position data may include GPS data, and data regarding operator position determined from the perspective of the vehicle cabin or the like. In a third step, the vehicle base station may generate relative positional data based on the operator positional data and vehicle data 505 or the like. In a next step, the vehicle base station may apply a trained machine learning algorithm to the generated relative positional data to determine if an operator is in a reduced state of alertness 507 or the like. And the vehicle base station may take mitigation steps responsive to determining that the operator is in a reduced state of alertness 509 such as stopping the vehicle by applying emergency brakes or the like.

In some embodiments, mitigation steps may include sending a text alarm, visual cue such as an alert or notification, or audio alarm to the operator of the vehicle or the like. The operator may then indicate that they are alert and paying attention by way of a jaw clench or providing input to a touchscreen on a vehicle base station or the like. In such an embodiment, the system may wait to apply the emergency brake or other measure until no response or an inappropriate response is received from the operator. The jaw clench may be detected by the EMG and/or EEG sensors of the operator monitoring device or the like. For example, the jaw clench may result in the generation of a nerve impulse in the motor cortex, the nerve impulse will be transmitted to the respective muscles through a nerve, and the activation of the muscle will lead to its contraction or the like. More particularly, for a jaw clench there is a nerve impulse generated in the motor cortex of the brain and the impulse is transmitted through the mandibular division of the trigeminal nerve to the masseter muscle or the like. This nerve impulse activates the masseter muscle by increasing the influx of calcium ions into the muscle cells causing depolarization and contraction of the muscle fibers and in the whole muscle or the like. The EEG sensor of the operator monitoring device may be useful to identify the nerve impulse generated in the motor cortex and provide a signal based on amplitude and frequency or the like. Further, the EMG sensor of the operator monitoring device may be useful to identify the electrical changes taken place during the contraction of the muscle fibers and provide us with a signal for use in determining that the operator is alert or the like.

The disclosed embodiments may be applied in many different settings including, but not limited to, locomotives, engineer/driver/operator settings, recreational vehicles, personal use vehicles, heavy commercial vehicles, aircrafts, ship operations, military vehicles, mass transit systems, and the like. While conventional systems utilize mainly digital camera image capturing and processing techniques for operator fatigue detection, they are limited by the reliability of their systems and the size of data used or the like. To that end, the disclosed embodiments may provide advantages in that there is no need for complex computations and the data size of information transferred to a central server is minimal. Further, the disclosed systems may be integrated into already existing transportation settings without requiring extensive hardware changes and retrofitting or the like.

Figure 6:
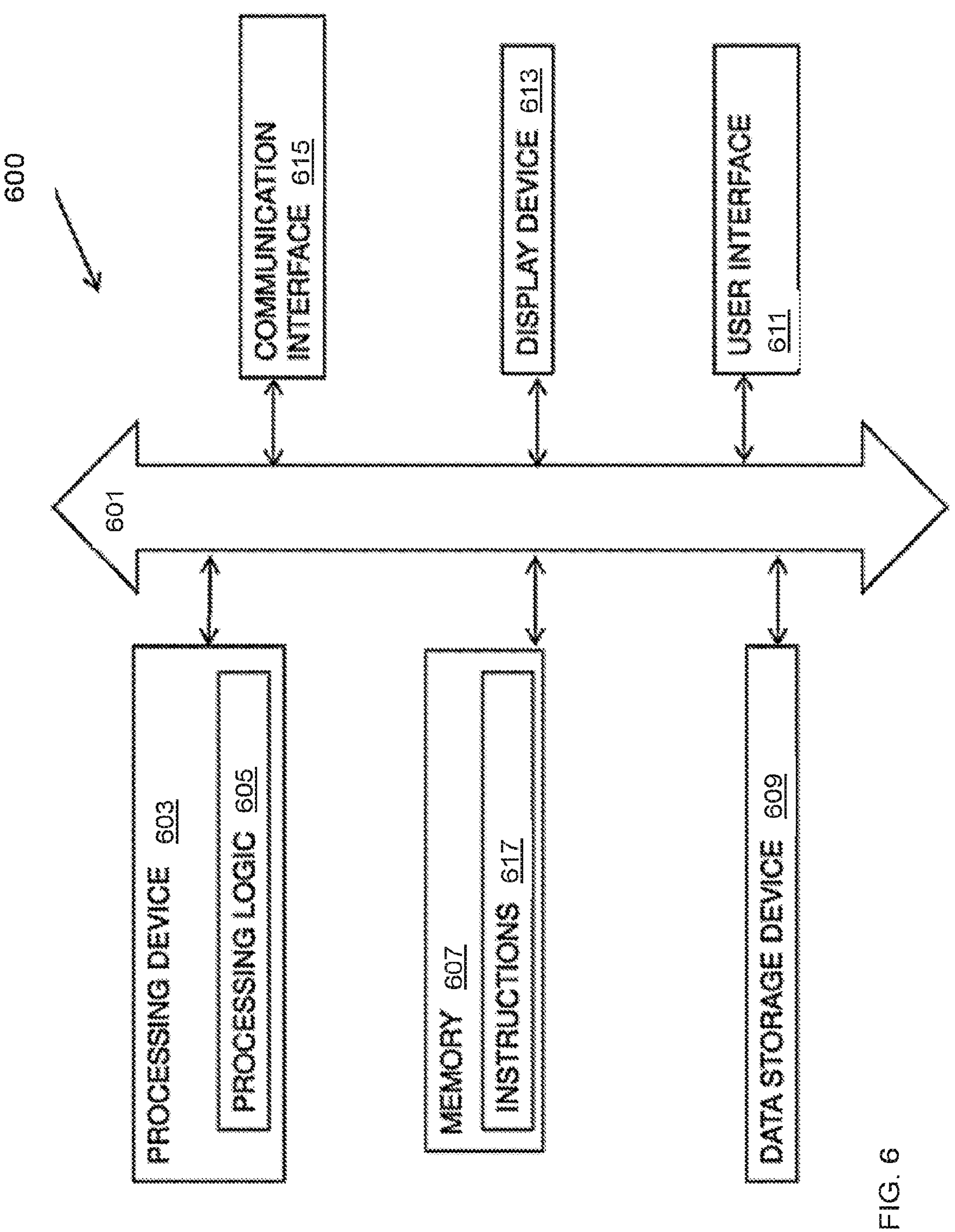
FIG. 6 provides a system diagram for computer architecture built in accordance with aspects of the present disclosure.

FIG. 6 illustrates a computer system in accordance with some embodiments of the present disclosure. FIG. 6 illustrates a functional block diagram of a machine in the example form of computer system 600, within which a set of instructions for causing the machine to perform any one or more of the methodologies, processes or functions discussed herein may be executed or the like. In some examples, the machine may be connected (e.g., networked) to other machines or the like as described above. The machine may operate in the capacity of a server or a client machine in a client-server network environment, or as a peer machine in a peer-to-peer (or distributed) network environment or the like. The machine may be any special-purpose machine capable of executing a set of instructions (sequential or otherwise) that specify actions to be taken by that machine for performing the functions described herein or the like. Further, while only a single machine is illustrated, the term "machine" shall also be taken to include any collection of machines that individually or jointly execute a set (or multiple sets) of instructions to perform any one or more of the methodologies discussed herein or the like. In some examples, each of the operator monitoring device, vehicle base station, and the server system of FIG. 1 may be implemented by the example machine shown in FIG. 6 (or a combination of two or more of such machines) or the like.

Example computer system 600 may include processing device 603, memory 607, data storage device 609 and communication interface 615, which may communicate with each other via data and control bus 601 or the like. In some examples, computer system 600 may also include display device 613 and/or user interface 611 or the like.

Processing device 603 may include, without being limited to, a microprocessor, a central processing unit, an application specific integrated circuit (ASIC), a field programmable gate array (FPGA), a digital signal processor (DSP) and/or a network processor or the like. Processing device 603 may be configured to execute processing logic 605 for performing the operations or the like described herein. In general, processing device 603 may include any suitable special-purpose processing device specially programmed with processing logic 605 to perform the operations or the like described herein.

Memory 607 may include, for example, without being limited to, at least one of a read-only memory (ROM), a random-access memory (RAM), a flash memory, a dynamic RAM (DRAM) and a static RAM (SRAM), storing computer-readable instructions 617 executable by processing device 603 or the like. In general, memory 607 may include any suitable non-transitory computer readable storage medium storing computer-readable instructions 617 executable by processing device 6503 for performing the operations or the like described herein. Although one memory device 607 is illustrated in FIG. 6, in some examples, computer system 600 may include two or more memory devices (e.g., dynamic memory and static memory) or the like.

Computer system 600 may include communication interface device 611, for direct communication with other computers (including wired and/or wireless communication), and/or for communication with network or the like (see FIG. 1). In some examples, computer system 600 may include display device 613 (e.g., a liquid crystal display (LCD), a touch sensitive display, etc.) or the like. In some examples, computer system 600 may include user interface 611 or the like (e.g., an alphanumeric input device, a cursor control device, etc.).

In some examples, computer system 600 may include data storage device 609 storing instructions (e.g., software) for performing any one or more of the functions or the like described herein. Data storage device 609 may include any suitable non-transitory computer-readable storage medium, including, without being limited to, solid-state memories, optical media and magnetic media or the like.

Various implementations of the systems and techniques described here may be realized in digital electronic circuitry, integrated circuitry, especially designed ASICS (Application Specific Integrated Circuits), computer hardware, firmware, software, and/or combinations thereof or the like. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device or the like. These computer programs (also known as programs, software, Software applications or code) include machine instructions for a programmable processor and may be implemented in a high-level procedural and/or object-oriented programming language, and/or in assembly/machine language or the like. As used herein, the terms "machine-readable medium" "computer-readable medium" refers to any computer program product, apparatus and/or device (e.g., magnetic discs, optical disks, memory, Programmable Logic Devices (PLDs)) or the like used to provide machine instructions and/or data to a programmable processor, including a machine-readable medium that receives machine instructions as a machine-readable signal or the like. The term "machine-readable signal" refers to any signal used to provide machine instructions and/or data to a programmable processor or the like. To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer or the like. Other kinds of devices may be used to provide for interaction with a user as well: for example, feedback provided to the user may be any form of sensory feedback (e.g., visual feedback, auditory feedback, or tactile feedback); and input from the user may be received in any form, including acoustic, speech, or tactile input or the like.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or frontend components or the like. The components of the system may be interconnected by any form or medium of digital data communication (e.g., a communication network) or the like. Examples of communication networks include a local area network ("LAN"), a wide area network ("WAN"), and the Internet and the like. The computing system may include clients and servers. A client and server are generally remote from each other and typically interact through a communication network and the like. The relationship of client and server arises by virtue of computer programs running on the respective computers and having a client-server relationship to each other or the like. Several embodiments have been described. Nevertheless, it will be understood that various modifications may be made without departing from the spirit and scope of the invention or the like. For example, much of this document has been described with respect to television advertisements, but other forms of future, viewership-based advertisements or the like may also be addressed. Such as radio advertisements and on-line video advertisements. In addition, the logic flows depicted in the figures do not require the particular order shown, or sequential order, to achieve desirable results or the like. In addition, other steps may be provided, or steps may be eliminated, from the described flows, and other components may be added to, or removed from, the described systems or the like. Accordingly, other embodiments are within the scope of the following claims.

Although the present disclosure may provide a sequence of steps, it is understood that in some embodiments, additional steps may be added, described steps may be omitted, and the like. Additionally, the described sequence of steps may be performed in any suitable order or the like.

While illustrative embodiments have been described herein, the scope thereof includes all embodiments having equivalent elements, modifications, omissions, combinations (e.g., of aspects across various embodiments), adaptations and/or alterations as would be appreciated by those in the art based on the present disclosure or the like. For example, the number and orientation of components shown in the exemplary systems may be modified.

Thus, the foregoing description has been presented for purposes of illustration. It is not exhaustive and is not limiting to the precise forms or embodiments disclosed. Modifications and adaptations will be apparent to those skilled in the art from consideration of the specification and practice of the disclosed embodiments.

We claim:

1. A system for operator monitoring comprising:

an earbud comprising an operator positional information sensor and a biosensor configured to record operator positional information and operator biosignals from an operator; and a vehicle base station communicatively coupled to the earbud, the vehicle base station comprising one or more vehicle positional sensors and a user status artificial intelligence module configured to:

establish a zero-axis for the operator within a three-dimensional space of a vehicle by analyzing the operator positional information and the operator biosignals during a guided training process comprising a range of one or more gestures and positions of the operator;

determine operator alertness status by analyzing the operator positional information, the operator biosignals, and vehicle positional information from the vehicle positional sensors during operation of the vehicle to determine at least one of:

whether the operator is exhibiting electrical activity indicative of eye blinking via the biosensor, whether the operator is exhibiting central nervous system electrical activity indicative of lack of attentiveness or fatigue, whether the operator is exhibiting a change in a line of sight from the zero-axis to a new axis for at least a threshold period of time via the operator positional information sensor, whether the operator is exhibiting a change in a line of sight from the normal zero-axis to the new axis with at least a threshold frequency via the operator positional information sensor, or whether a head position of the operator is deviating from a standard position via the operator positional information sensor, initiate a first corrective measure responsive to determining that the operator is in a state of reduced alertness, monitor the operator positional information and operator biosignals for an indication that the operator acknowledged the first corrective measure via a predetermined gesture, and upon determining that the indication is not received within a predetermined time period, initiate a second corrective measure.

2. The system of claim 1, wherein the biosensor comprises an electroencephalogram (EEG) sensor, an electrocardiogram (ECG) sensor, or an electromyography sensor (EMG).

3. The system of claim 1, wherein the user status artificial intelligence module comprises:

a learning sub-module comprising normal and abnormal operator gesture patterns for training a random forest algorithm; and a prediction sub-module configured to apply the trained random forest algorithm to the operator biosignals and the operator positional information received from the earbud.

4. The system of claim 1, wherein the vehicle positional sensors comprise an accelerometer, gyroscope, magnetometer, or global positioning system (GPS).

5. The system of claim 1, wherein the operator positional sensors comprise an accelerometer, gyroscope or magnetometer.

6. The system of claim 1, wherein the earbud comprises a pressure sensor.

7. The system of claim 1, wherein the at least a portion of the earbud is positioned within an ear canal of an operator.

8. The system of claim 1, wherein the at least a portion of the earbud is positioned adjacent to a back side of a concha.

9. The system of claim 1, wherein the system comprises:

a server communicatively coupled to the earbud or the vehicle base station, wherein the server comprises an asset tracking module configured to receive and display vehicle positional data from a plurality of vehicles.

10. The system of claim 1, wherein the first corrective measure comprises at least one of an audio alarm and a visual alarm, and the second corrective measure comprises at least one of an audio alarm, a visual alarm, and altered operation of a vehicle on which the vehicle base station is located, wherein the predetermined gesture comprises one or more of a jaw clench and an eye blink.

11. A method for operator monitoring comprising:

recording, via an earbud comprising an operator positional information sensor and a biosensor, operator positional information via the operator positional information sensor and operator biosignals via the biosensor from an operator;

transmitting the operator positional information and the operator biosignals to a vehicle base station communicatively coupled to the earbud, wherein the vehicle base station is associated with a vehicle;

generating, at the vehicle base station, vehicle positional information;

establishing, at the vehicle base station, a zero-axis for the operator within a three-dimensional space of the vehicle by applying a user stats artificial intelligence module to the operator positional information and the operator biosignals while performing a guided training process comprising a range of one or more gestures and positions of the operator;

determining, at the vehicle base station, operator alertness status by applying the user status artificial intelligence module to the operator positional information, the operator biosignals, and the vehicle positional information during operation of the vehicle by determining at least one of:

whether the operator is exhibiting electrical activity indicative of eye blinking via the biosensor, whether the operator is exhibiting central nervous system electrical activity indicative of lack of attentiveness or fatigue, whether the operator is exhibiting a change in a line of sight from the zero-axis to a new axis for at least a threshold period of time via the operator positional information sensor, whether the operator is exhibiting a change in a line of sight from the zero-axis to the new axis with at least a threshold frequency via the operator positional information sensor, or whether a head position of the operator is deviating from a standard position via the operator positional information sensor;

initiating, at the vehicle base station, a first corrective measure responsive to determining that the operator is in a state of reduced alertness;

monitoring, at the vehicle base station, the operator positional information and operator biosignals for an indication that the operator acknowledged the first corrective measure via a predetermined gesture; and upon determining that the indication is not received within a predetermined time period, initiating, at the vehicle base station, a second corrective measure.

12. The method of claim 11, wherein recording the operator biosignals comprises:

recording at least one of electroencephalogram (EEG) signals, electrocardiogram (ECG) signals, and electromyography (EMG) signals;

identifying a most relevant signal by applying a filter to the recorded signals; and applying feature extraction to the identified most relevant signal.

13. The method of claim 11, wherein the operator positional information sensor comprises at least one of an accelerometer, gyroscope, or magnetometer.

14. The method of claim 11, the method comprising:

training the user status artificial intelligence module by providing normal and abnormal operator gesture patterns to a random forest algorithm.

15. The method of claim 11, wherein the user status artificial intelligence module comprises a random forest algorithm.

16. The method of claim 11, wherein the first corrective measure comprises at least one of an audio alarm and a visual alarm and the second corrective measure comprises at least one of an audio alarm, a visual alarm, and altering operation of the vehicle on which the vehicle base station is located.

17. The method of claim 11, wherein the predetermined gesture is comprises one or more of a jaw clench and an eye blink.

18. The method of claim 11, the method comprising:

transmitting at least one of the operator positional information and the vehicle position information to a server system having an asset tracking module.

19. The method of claim 11, the method comprising:

positioning the at least a portion of the earbud within an ear canal of an operator or adjacent to a back side of a concha.

20. The method of claim 11, wherein generating the vehicle positional information comprises determining a vehicle position based on at least one of an accelerometer, gyroscope, magnetometer and global positioning device of the vehicle base station.

* * * * *